(12) United States Patent
Arsenault et al.

(10) Patent No.: US 11,333,556 B2
(45) Date of Patent: May 17, 2022

(54) WAVELENGTH DETERMINATION USING AN OPTICAL FILTER HAVING COMPLEMENTARY TRANSMISSION AND REFLECTION COEFFICIENTS

(71) Applicant: Simmonds Precision Products, Inc., Vergennes, VT (US)

(72) Inventors: Tyler Arsenault, Charlotte, VT (US); Peter J. Carini, Underhill, VT (US); David H. Crowne, Weybridge, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 527 days.

(21) Appl. No.: 15/603,126

(22) Filed: May 23, 2017

(65) Prior Publication Data
US 2018/0340831 A1 Nov. 29, 2018

(51) Int. Cl.
| G01J 3/51 | (2006.01) |
| G01J 9/02 | (2006.01) |
| G01D 5/353 | (2006.01) |
| G01J 9/00 | (2006.01) |
| G01J 11/00 | (2006.01) |

(52) U.S. Cl.
CPC ............ *G01J 3/51* (2013.01); *G01D 5/35316* (2013.01); *G01D 5/35354* (2013.01); *G01J 9/00* (2013.01); *G01J 9/0246* (2013.01); *G01J 11/00* (2013.01); *G01D 5/35312* (2013.01); *G01J 2009/0226* (2013.01)

(58) Field of Classification Search
CPC ......... G01J 3/51; G01J 11/00; G01D 5/35354
See application file for complete search history.

(56) References Cited

U.S. PATENT DOCUMENTS 7,088,441 B2 8/2006 Nahum et al.
7,253,902 B2 8/2007 Feldman
(Continued)

FOREIGN PATENT DOCUMENTS

JP S55142220 A 11/1980
WO 9510759 A1 4/1995

OTHER PUBLICATIONS

European Office Action dated Feb. 5, 2020, received for corresponding European Application No. 18172829.6, 4 pages.

*Primary Examiner* — Hwa Andrew Lee
(74) *Attorney, Agent, or Firm* — Kinney & Lange, P.A.

(57) ABSTRACT

Apparatus and associated methods relate to determining the wavelength of a narrow-band light beam. The narrow-band light beam is passed through an optical filter. The optical filter has complementary and monotonically-varying transmission and reflection coefficients within a predetermined band of wavelengths. The predetermined band of wavelengths includes the wavelength of the narrow-band light beam. A first photodetector detects amplitude of a first portion of the narrow-band light beam transmitted by the optical filter. A second photodetector detects amplitude of a second portion of the narrow-band light beam reflected by the optical filter. The wavelength of the narrow-band light beam is determined, based on a ratio of the determined amplitudes of the first and second portions of the narrow-band light beam transmitted and reflected, respectively.

1 Claim, 5 Drawing Sheets

(56) References Cited

U.S. PATENT DOCUMENTS

| | | | |
|---|---|---|---|
| 7,495,775 B2* | 2/2009 | Carr | G01L 9/0079 |
| | | | 356/35.5 |
| 7,724,375 B1 | 5/2010 | Novikov et al. | |
| 2002/0030818 A1 | 3/2002 | Ruck et al. | |
| 2002/0044286 A1* | 4/2002 | Le-Gall | H01S 5/0687 |
| | | | 356/519 |
| 2002/0093657 A1 | 7/2002 | Friberg et al. | |
| 2003/0218759 A1* | 11/2003 | Lee | G01J 9/0246 |
| | | | 356/519 |
| 2005/0062976 A1* | 3/2005 | Morris | G01J 9/02 |
| | | | 356/454 |
| 2006/0149150 A1* | 7/2006 | Wake | A61B 5/0059 |
| | | | 600/473 |
| 2007/0195328 A1* | 8/2007 | Tan | G01J 3/26 |
| | | | 356/454 |
| 2008/0106745 A1* | 5/2008 | Haber | G01B 11/18 |
| | | | 356/519 |
| 2008/0309945 A1* | 12/2008 | Kojima | G01D 5/35383 |
| | | | 356/478 |
| 2010/0124790 A1* | 5/2010 | Ko | G01N 21/31 |
| | | | 436/537 |

* cited by examiner

WAVELENGTH DETERMINATION USING AN OPTICAL FILTER HAVING COMPLEMENTARY TRANSMISSION AND REFLECTION COEFFICIENTS

BACKGROUND

During operation of an aircraft, numerous on-board components and sub-systems are continuously or periodically monitored. Various methods for monitoring these components and sub-systems of the aircraft have been used. For example, sensors and/or transducers can be affixed to an aircraft at specific locations so as to produce signals indicative of various physical phenomena experienced at those specific locations. These signals can then be transmitted to an analyzer that interprets the signals received by the analyzer. These signals can be processed to generate parametric data that can be correlated to measurements of physical phenomena. Some of the specific locations where it would be desirable to affix a sensor and/or transducer might be locations that have harsh environments. For example, some such locations might expose any affixed sensor to high temperatures, high pressures, high levels of exposure to electromagnetic interference, etc.

In many of these harsh environment locations, optical transducers have found use. Optical sensors and/or transducers can produce optical signals indicative of various physical phenomena. For example, optical sensors and/or transducers can produce optical signals indicative of stress, strain, temperature, tilt, rotation, vibration, pressure, etc. Various sensors and/or transducers employ various types of technologies. For example, some sensors use Fabry-Pérot Interferometry (FPI). Some sensors use Fiber Bragg Grating (FBG) technologies. Some sensors use intensity modulation techniques. Some of these technologies and techniques produce optical signals having a spectrum that is indicative of the measured parameter. Spectrum analysis and/or spectral measurement of such signals is performed to determine a measure of the physical phenomena causing the specific spectrum of the optical signal.

The fidelity of the spectral measurement can correlate to the precision and/or accuracy of the measured physical parameter. The rate at which such spectral measurements can be performed limit the rate that measurements of such physical parameters can be provided. Thus, the present disclosure is directed to methods and systems for fast determination of the wavelength of a light beam, thereby obtaining fast determination of the physical parameters measured by the Bragg gratings.

SUMMARY

Apparatus and associated methods relate to a system for determining the wavelength of a narrow-band beam of light. The system includes an optical filter having complementary transmission and reflection coefficients within a predetermined band of wavelengths inclusive of the wavelength of the narrow-band beam of light. Each of the transmission and reflection coefficients monotonically varies throughout the predetermined band of wavelengths. The system includes a first photodetector configured to detect amplitude of a first portion of the beam of light reflected by the optical filter and to generate a first output signal indicative of the detected amplitude of a first portion of the beam of light reflected by the optical filter. The system includes a second photodetector configured to detect amplitude of a second portion of the beam of light transmitted through the optical filter and to generate a second output signal indicative of the detected amplitude of the second portion of the beam of light transmitted through the optical filter. The system includes a calculation engine configured to determine, based on a ratio of the first and second output signals, the wavelength of the beam of light.

Some embodiments relate to a method for determining the wavelength of a narrow-band light beam. The method includes optically filtering, using an optical filter having complementary transmission and reflection coefficients within a predetermined band of wavelengths inclusive the wavelength of the narrow-band light beam, a narrow-band light beam. Each of the transmission and reflection coefficients of the optical filter monotonically varies throughout the predetermined band of wavelengths. Then, the method detects, using a first photodiode, amplitude a first portion of the narrow-band light beam reflected by the optical filter. The method then generates a first output signal indicative of the detected amplitude of first portion of the narrow-band light beam reflected by the optical filter. Then, the method detects, using a second photodetector, amplitude of a second portion of the narrow-band light beam transmitted through the optical filter. The method then generates a second output signal indicative of the detected amplitude of the second portion of the narrow-band light beam transmitted through the optical filter. The method determines, using a calculation engine, the wavelength of the narrow-band light beam, based on a ratio of the first and second output signals.

DETAILED DESCRIPTION

Apparatus and associated methods relate to determining the wavelength of a narrow-band light beam. The narrow-band light beam is passed through an optical filter. The optical filter has complementary and monotonically-varying transmission and reflection coefficients within a predetermined band of wavelengths. The predetermined band of wavelengths includes the wavelength of the narrow-band light beam. A first photodetector detects amplitude of a first portion of the narrow-band light beam transmitted by the optical filter. A second photodetector detects amplitude of a second portion of the narrow-band light beam reflected by the optical filter. The wavelength of the narrow-band light beam is determined, based on a ratio of the determined amplitudes of the first and second portions of the narrow-band light beam transmitted and reflected, respectively.

Figure 1:
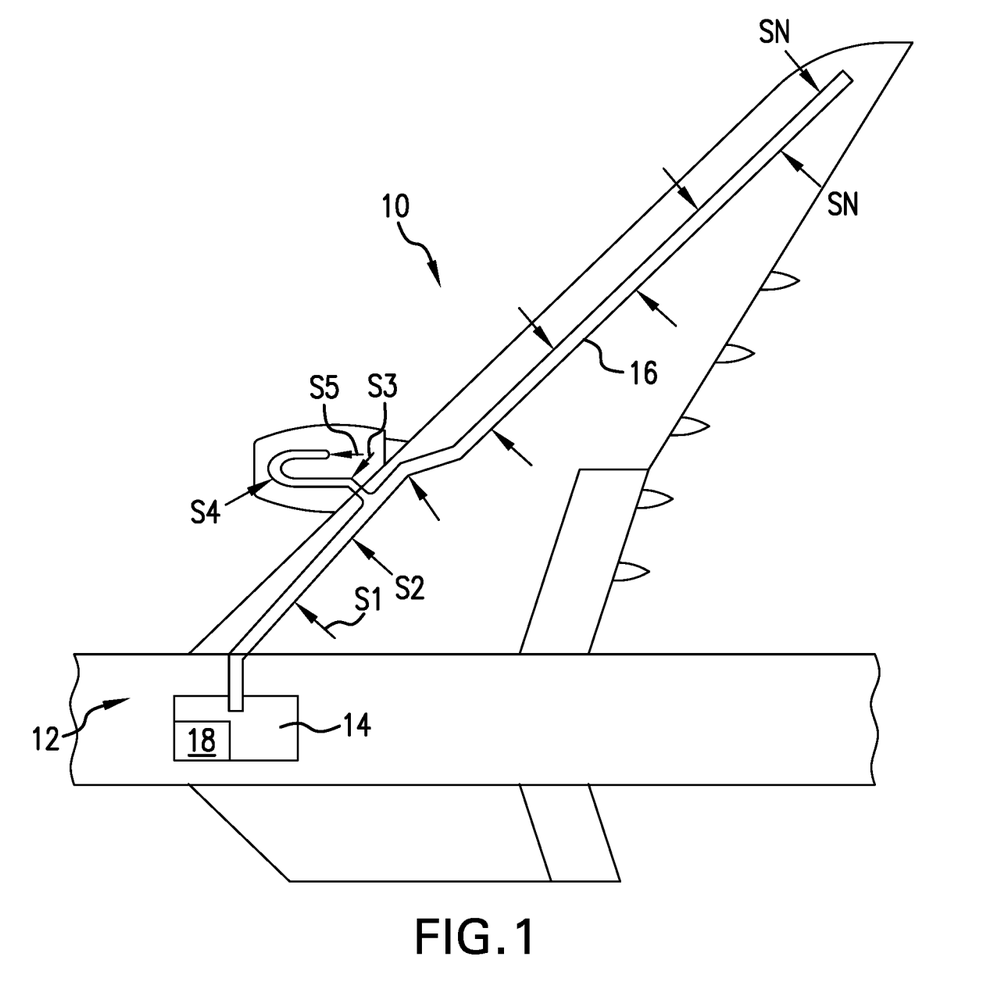
FIG. 1 is a schematic diagram of an exemplary system for monitoring health and usage of components on an aircraft wing using optical spectral analysis.

FIG. 1 is a schematic diagram of an exemplary system for monitoring health and usage of components on an aircraft wing using optical spectral analysis. In FIG. 1, a portion of aircraft 10 is shown with Health and Usage Monitoring System (HUMS) 12. HUMS 12 includes controller 14, optical fiber network 16 and sensors $S_1$-$S_N$. Sensors $S_1$-$S_N$ are located at various specific locations along optical fiber network 16. Each of sensors $S_1$-$S_N$ can be external to optical fiber network 16 or can be formed within optical fiber network 16. Each of sensors $S_1$-$S_N$ can generate and/or affect an optical signal in response to a physical parameter.

For example, in some embodiments, controller 14 generates a pulse of optical energy and directs the generated pulse into optical fiber network 16. Optical fiber network 16 receives the generated pulse of optical energy and transmits the received pulse of optical energy to sensors $S_1$-$S_N$ distributed along optical fiber network 16. As each of sensors $S_1$-$S_N$ encounters the transmitted pulse of optical energy, a portion of the encountered pulse of optical energy is reflected by sensors $S_1$-$S_N$. The portion of the pulse of optical energy reflected by each sensor $S_X$ is indicative of the physical parameter sensed by sensor $S_X$. The portion of the pulse of optical energy reflected by some sensors can be of a narrow band of wavelengths and/or be characterized by a specific wavelength. That specific wavelength and/or narrow-band of wavelengths can be indicative of the sensed physical parameter.

Controller 14 then receives and processes the sequence of reflected pulses of optical energy, so as to determine the physical parameters sensed by sensors $S_1$-$S_N$. Controller 14 includes a high-speed spectrum analyzer 18. In various embodiments, high-speed spectrum analyzer 18 is configured to determine wavelengths of narrow-band reflected pulses of optical energy at various rates. For example, in some embodiments, high-speed spectrum analyzer 18 can determine wavelengths of narrow-band light beams at rates of 100 ksps, 1 Msps, 10 Msps, or 100 Msps or higher. The techniques used for such high rates of spectral analysis will be disclosed below.

In some embodiments, optical fiber network 16 includes a plurality of optical fibers. In other embodiments, optical fiber network 16 includes a signal optical fiber. In some embodiments, optical fiber network 16 includes one or more optical fibers configured in a loop arrangement. In some embodiments optical fiber network 16 includes one or more optical fibers that extend from the HUMS 12 in a single-ended fashion.

Figure 2:
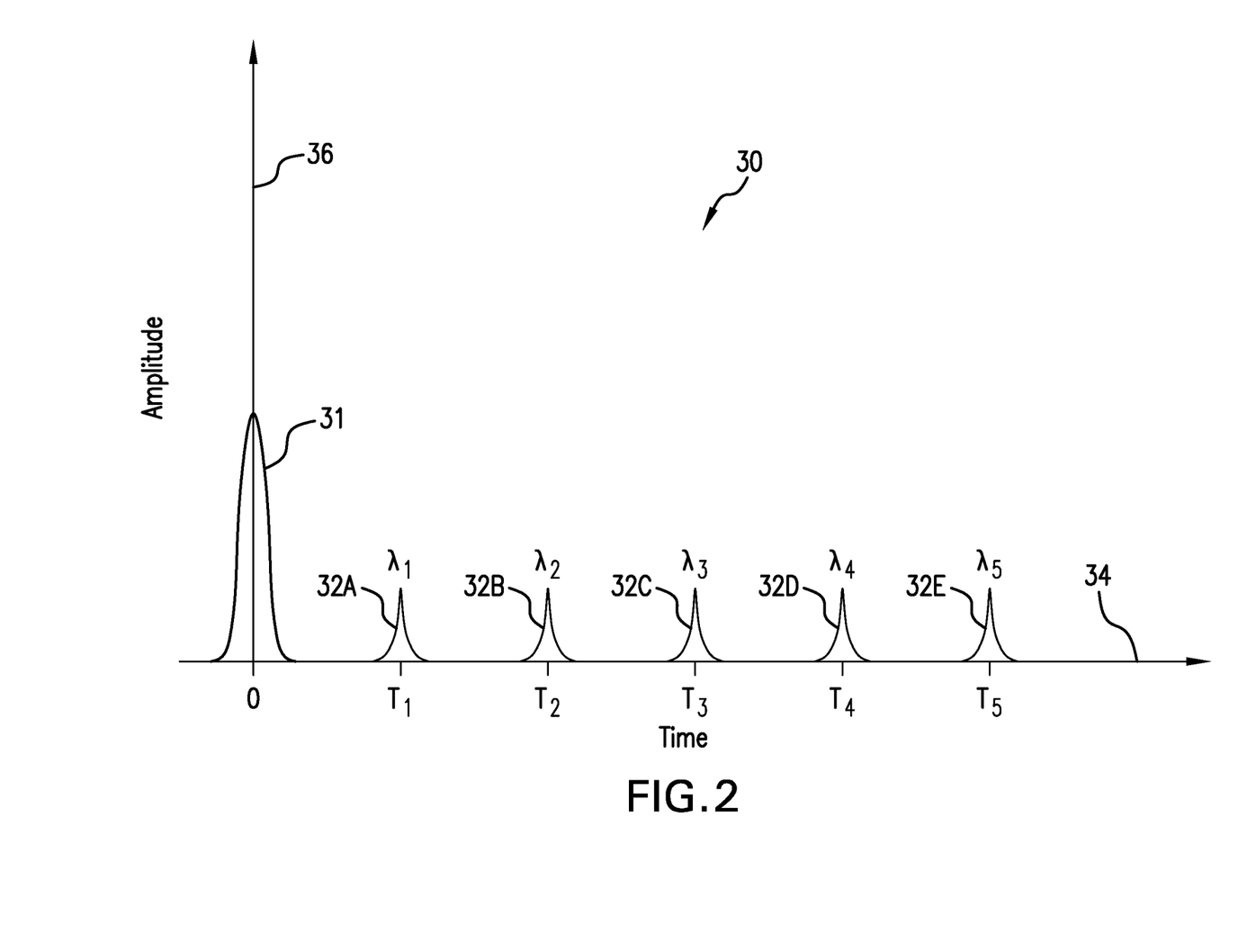
FIG. 2 is a graph of a sequence of optical pulses backscattered from sensors distributed along a loop of an optical fiber.

FIG. 2 is a graph of a sequence of optical pulses backscattered from sensors distributed along a loop of an optical fiber. In FIG. 2, graph 30 depicts a train of optical pulses 32A-32E generated by sensors $S_1$-$S_5$, shown in FIG. 1. Graph 30 includes horizontal axis 34, which is indicative of time. Graph 30 also include vertical axis 36, which is indicative of amplitude. Because sensor $S_1$ is located closest to controller 14, optical pulse 32A is the first to be received by controller 14. Because sensor $S_2$ is located next closest to controller 14, optical pulse 32B is the second to be received by controller 14. In this way, controller can associate each of optical pulses 32A-32E with sensors $S_1$-$S_5$, respectively, based on the time delay between the initial transmission of the generated optical pulse and in receipt of the reflected optical pulses $S_1$-$S_5$.

Each of reflected optical pulses 32A-32E can have a specific wavelength and/or a narrow-band of wavelengths and indicated in graph 30 by $\lambda_1$-$\lambda_5$. Thus, as optical pulses 32A-32E are received by controller 14 (depicted in FIG. 1), high-speed spectrum analyzer 18 (also depicted in FIG. 1) determines the corresponding specific wavelengths or narrow-band of wavelengths $\lambda_1$-$\lambda_5$, respectively. Because high-speed spectrum analyzer 18 is capable of determining the specific wavelengths or narrow-band of wavelengths $\lambda_1$-$\lambda_5$ generated by sensors $S_1$-$S_5$ at high rates, sensors can be distributed at small intervals along optical fiber network 16 (depicted in FIG. 1) and/or pulses can be generated by controller 14 (also depicted in FIG. 1) at high rates. In some embodiments, optical fiber loop includes a series of optical fibers. Each of the series of optical acoustic sensors is optically coupled to a respective optical fiber. In such embodiments, FBG-type sensors can all have the same spatial grating frequency.

Figure 3:
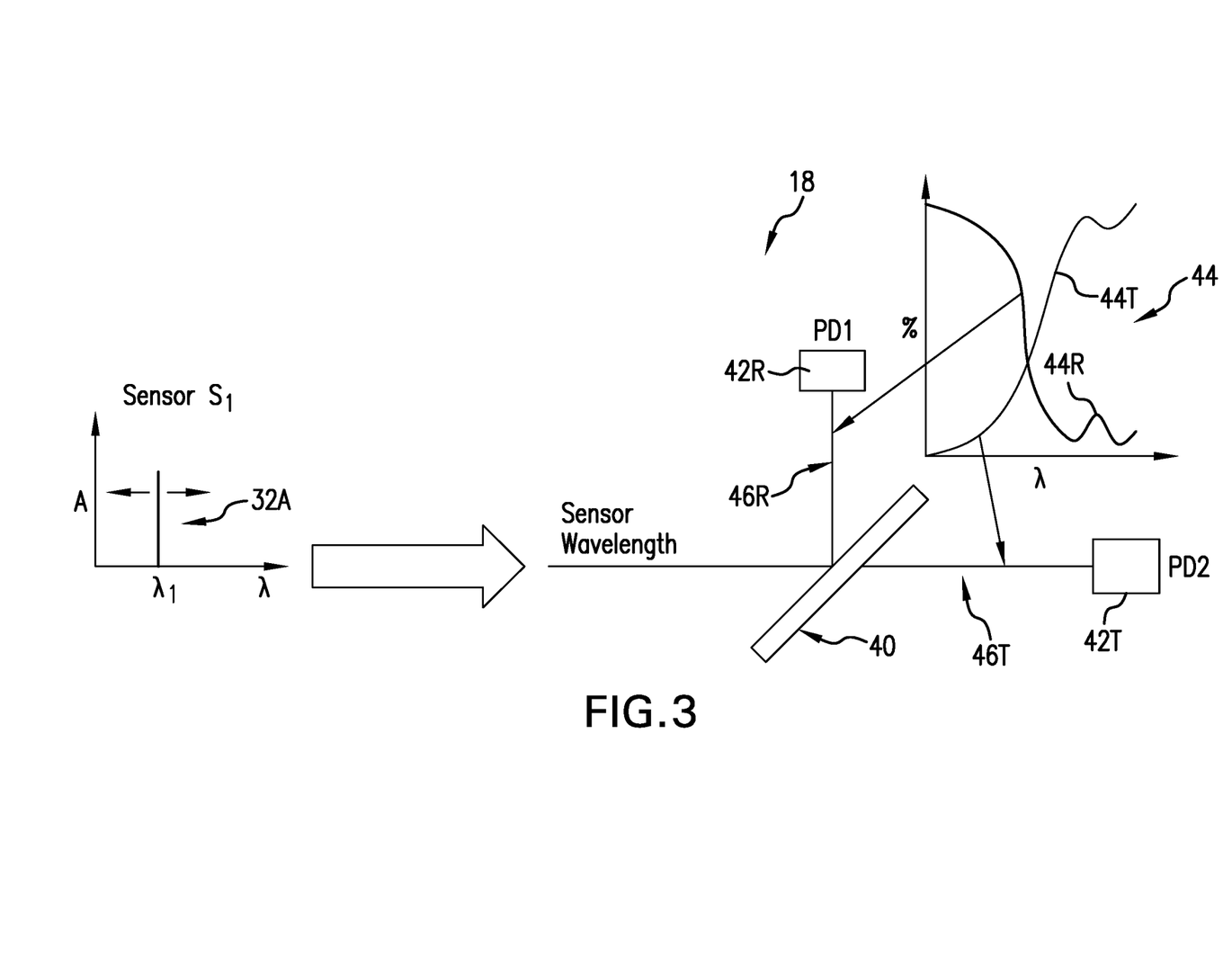
FIG. 3 is a schematic diagram of an exemplary method for fast determination of a wavelength of a narrow-band light beam.

FIG. 3 is a schematic diagram of an exemplary method for fast determination of a wavelength of a narrow-band light beam. In FIG. 3, high-speed spectrum analyzer 18 of FIG. 1 is shown in schematic form. High-speed spectrum analyzer 18 receives narrow-band light beam 32A reflected by a sensor $S_1$. The narrow-band light beam 32A has a specific wavelength and/or a narrow-band of wavelengths such that narrow-band light beam 32A can be characterized by a wavelength metric $\lambda_1$. Similarly, each of narrow-band light beams 32B-32E has a specific wavelength and/or a narrow-band of wavelengths, which can be characterized by a wavelength metric $\lambda_2$-$\lambda_5$.

High-speed spectrum analyzer 18 includes optical filter 40, first photodetector 42T and second photodetector 42R. Optical filter 40 has complementary transmission and reflection coefficients that vary as a function of wavelength $\lambda$ as shown in graph 44. Optical filter 40 divides narrow-band light beam 32A into two portions—first portion 46T and second portion 46R. First portion 46T is the portion of narrow-band light beam 32A transmitted through optical filter 40. Second portion 46R is the portion of narrow-band light beam 32A reflected by optical filter 40. Because optical filter 40 has complimentary transmission and reflection coefficients, a sum of amplitudes of transmitted and reflected portions 46T and 46R is substantially independent of the wavelength of narrow-band light beam 32A.

Graph 44 depicts reflection coefficient 44R and transmission coefficient 44T relations as a function of wavelength $\lambda$. Reflection coefficient 44R is monotonically decreasing as a function of wavelength $\lambda$ over most of the wavelength range depicted in graph 44. Reflection coefficient 44R is near unity for low values of wavelength $\lambda$ within the depicted wavelength range in graph 44. Reflection coefficient 44R then decreases to near zero as the values of wavelength $\lambda$ increases within the depicted wavelength range in graph 44. Transmission coefficient 44T is monotonically increasing as a function of wavelength $\lambda$ over most of the wavelength range depicted in graph 44. Transmission coefficient 44T is near zero for low values of wavelength $\lambda$ within the depicted wavelength range in graph 44. Transmission coefficient 44T then increases to near unity for high values of wavelength $\lambda$ within the depicted wavelength range in graph 44. The functional relations of transmission coefficient 44T and reflection coefficient 44R cross over each other at crossover wavelength $\lambda_C$, where transmission coefficient 44T and reflection coefficient 44R are equal to each other.

If narrow-band light beam 32A has a wavelength $\lambda_1$ equal to the crossover wavelength $\lambda_C$, then transmitted and reflected portions 46T and 46R will have equal amplitudes. Furthermore, if transmitted and reflected portions 46T and 46R have equal amplitudes, then first and second photodetectors 42T and 42R will detect amplitudes that are equal one to another. Thus, the first and second output signals generated by first and second photodetectors will both be indicative of the equal detected magnitudes. A ratio of the detected magnitudes for such a narrow-band light beam 32A will equal one.

If, however, narrow-band light beam 32A has a wavelength $\lambda_1$ less that the crossover wavelength $\lambda_C$, then transmitted portions 46T will have amplitude that is less than amplitude of reflected portions 46R. A ratio of the detected amplitude of first portion 46T to second portion 46R for such a narrow-band light beam 32A will be less than one. If narrow-band light beam 32A has a wavelength $\lambda_1$ greater that the crossover wavelength $\lambda_C$, then transmitted portions 46T will have amplitude that is greater than amplitude of reflected portions 46R. A ratio of the detected amplitude of first portion 46T to second portion 46R for such a narrow-band light beam 32A will be greater than one. Over the monotonic portion of the functional relations of transmission and reflection coefficients 44T and 44R, the ratio of the detected amplitudes of first and second portions 46T/46R is indicative of the wavelength $\lambda_1$ of narrow-band light beam 32A.

Figure 4:
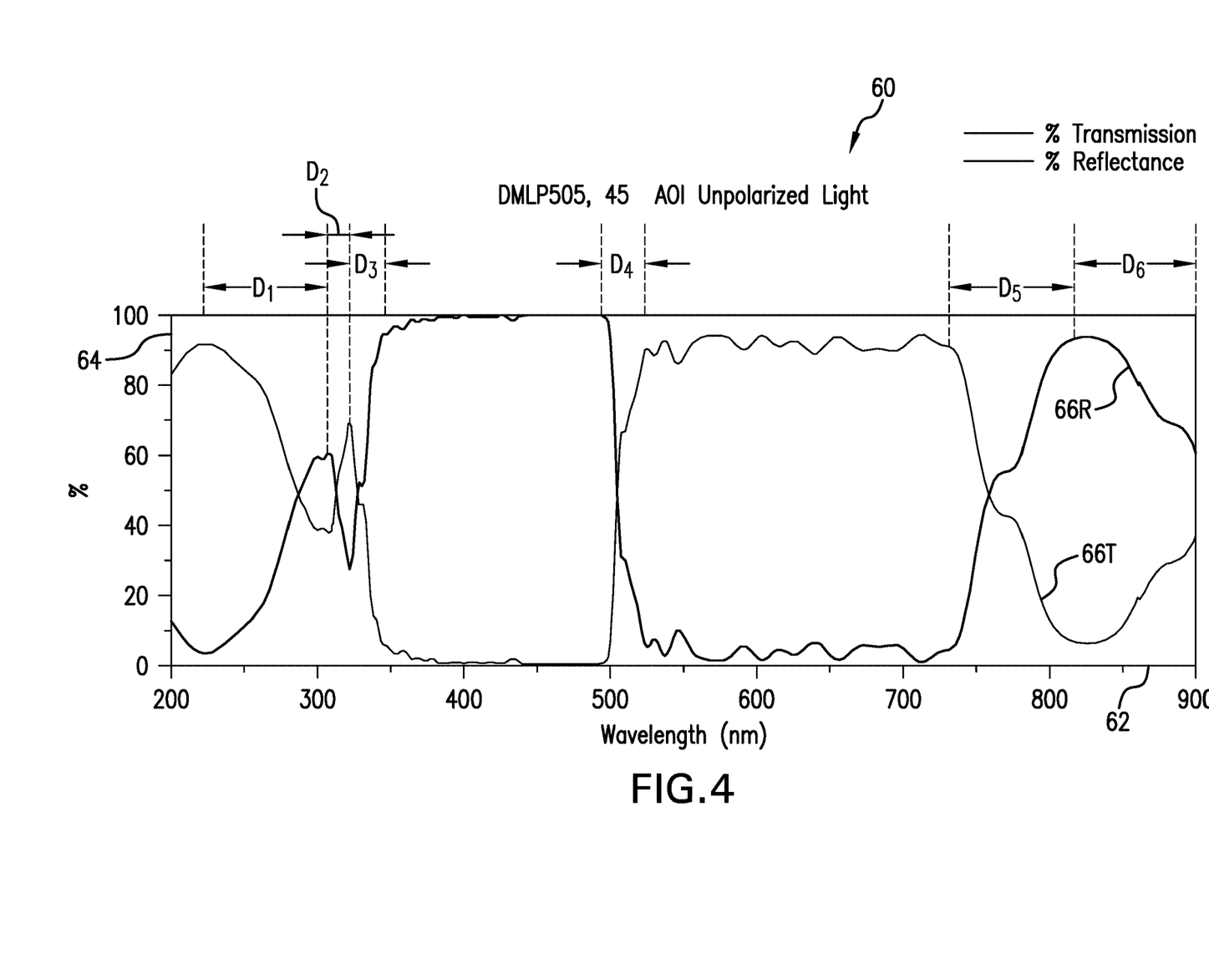
FIG. 4 is a graph of transmission and reflection coefficients of an example filter used in and exemplary fast spectrum analyzer.

FIG. 4 is a graph of transmission and reflection coefficients of an example filter used in an exemplary fast spectrum analyzer. In FIG. 4, graph 60 has horizontal axis 62 and vertical axis 64. Horizontal axis 62 is indicative of wavelength $\lambda$ of a light beam. Vertical axis 64 is indicative of a transmission coefficient and/or a reflection coefficient expressed in units of percentage (e.g., a value of 100 means total transmission and/or total reflection). Graph 62 also includes transmission relation 66T and reflection relation 66R corresponding to an example filter for use in a system for determining a wavelength of a narrow-band light beam. The depicted domain of wavelengths $\lambda$ extends from 200 nm to 900 nm. Within the depicted domain, there are various subdomains $D_1$-$D_6$ within which both transmission and reflection coefficients 66T and 66R are monotonic (e.g., monotonically decreasing or increasing).

Within subdomain $D_4$, for example, for narrow-band light beams having a wavelength $\lambda$ between 500 nm and 520 nm, the optical filter associated with graph 60 can be used in systems determining a wavelength of a narrow-band light beam such as high-speed spectrum analyzer 18, depicted in FIG. 3. Subdomain regions where a slope of the transmission and reflection coefficients 66T and 66R with respect to wavelength $\lambda$ is relatively large (e.g., subdomain $D_4$) can be regions that facilitate precise determination of wavelength $\lambda$ of a narrow-band light beam. Conversely, subdomain regions where a slope of the transmission and reflection coefficients 66T and 66R with respect to wavelength $\lambda$ is relatively small (e.g., subdomain $D_5$) can be regions that facilitate determination of narrow-band light beam wavelengths $\lambda$ that have a large variability.

Figure 5:
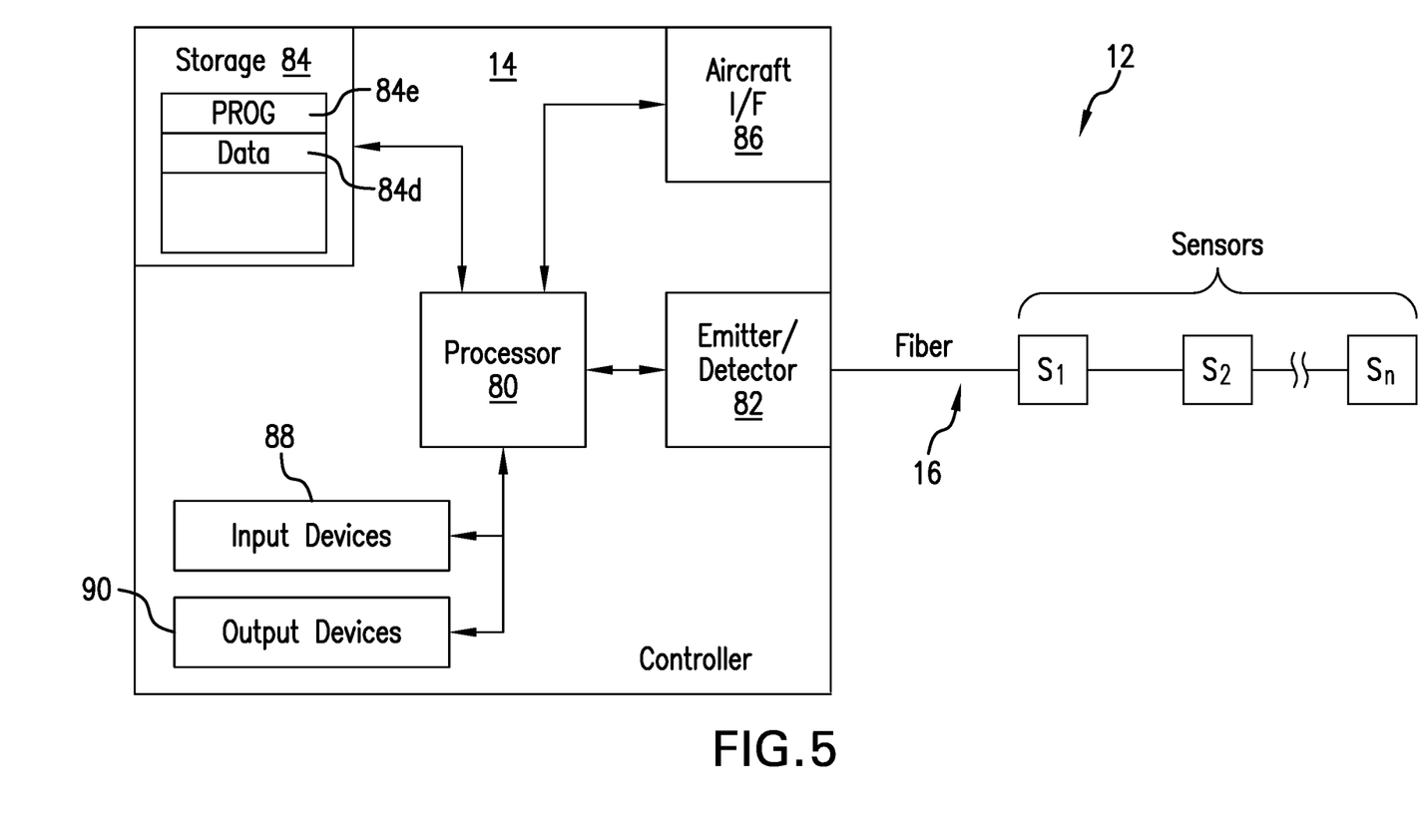
FIG. 5 is a block diagram of an exemplary system for determining the wavelength of a narrow-band beam of light.

FIG. 5 is a block diagram of an exemplary system for determining the wavelength of a narrow-band beam of light. In FIG. 5, Health and Usage monitoring system (HUMS) 12 includes controller 14, optical fiber network 16 and sensors $S_1$-$S_N$. Sensors $S_1$-$S_N$ are located at various specific locations along optical fiber network 16. Each of sensors $S_1$-$S_N$ can be external to optical fiber network 16 or can be formed within optical fiber network 16. Each of sensors $S_1$-$S_N$ can generate and/or affect an optical signal in response to a physical parameter.

Controller 14 includes processor(s) 80, optical emitter/detector module 82, storage device(s) 84, aircraft interface 86, input devices 88 and output devices 90. Processor(s) 80 can receive program instructions 84P from storage device(s) 84. Processor(s) 80 can be configured to control HUMS 12, based on received program instructions 84P. For example processor(s) 80 can be configured to cause optical emitter/detector module 82 to generate a light beam. The generated light beam is directed into optical fiber network 16 where it is transmitted to sensors $S_1$-$S_N$. Optical sensors $S_1$-$S_N$ can be configured to generate a narrow-band optical signal in response to the transmitted light beam. For example, one or more of the sensors $S_1$-$S_N$ can be a fiber Bragg grating. The fiber Bragg grating can generate reflect a narrow-band portion of the transmitted light beam. The reflected narrow-band portion of the reflected light beam can have a wavelength $\lambda$ that is indicative of a physical parameter. One or more of the sensors $S_1$-$S_N$ can be a Fabry Pérot interferometer, for example. Each of the Fabry Pérot interferometers can generate a narrow-band light signal and transmit it to optical fiber network 16.

Optical emitter/detector module 82 can detect the narrow-band light beams generated by sensors $S_1$-$S_N$. The timing at which the narrow-band light beams (relative to the transmitted light beam or some other timing metric) generated by sensors $S_1$-$S_N$ are received by optical emitter/detector module can be indicative of the specific sensor of sensors $S_1$-$S_N$ that generated the received narrow-band light beams. In some embodiments, optical emitter/detector module can include high-speed spectrum analyzer 18, such as is depicted in FIG. 3. In such an embodiment, optical emitter/detector module 82 has optical filter 40, which is configured to divide the received narrow-band light beams into transmitted and reflected portions 46T and 46R (depicted in FIG. 3). In such an embodiment, optical emitter/detector module 82 is configured with first and second photodiodes 42T and 42R configured to determine amplitudes of transmitted and reflected portions 46T and 46R, respectively (depicted in FIG. 3).

Processor(s) 80 receives, from optical emitter/detector module 82, output signals indicative of the determined amplitudes of transmitted and reflected portions 46T and 46R. Processor(s) 80 can then determine the wavelength $\lambda_1$-$\lambda_N$ of the received narrow-band light beams. The detected wavelengths $\lambda_1$-$\lambda_N$ can be indicative of physical parameters sensed by sensors $S_1$-$S_N$, respectively. In some embodiments, processor(s) 80 determines the wavelength $\lambda_1$-$\lambda_N$ based on a ratio of the output signals indicative of the determined amplitudes of transmitted and reflected portions 46T and 46R.

Processor(s) 80 can associate the determined wavelength $\lambda_1$-$\lambda_N$ with physical parameter values corresponding to those sensed by the sensors $S_1$-$S_N$. Processor(s) 80 can compare the associated parameter values with predetermined thresholds to determine if the sensed parameter values fall within a normal and/or expected range of values. If, for example, one or more of the associated parameter values does not fall within the expected range of values (e.g., out of range values and/or exceedances), processor(s) 80 can generate an alert signal and send the generated alert signal to aircraft interface 86. In some embodiments, processor(s) 80 can store and/or log the associated parameter values and/or exceedances in data memory 84D. In some embodiments, processor(s) 80 may interface with other input and output devices 88 and 90.

As illustrated in FIG. 5, controller 14 includes processor(s) 80, optical emitter/detector module 82, storage device(s) 84, aircraft interface 86, user input devices 88, and user output devices 90. However, in certain examples, controller 14 can include more or fewer components. For instance, in examples where controller 14 is an avionics unit, controller 14 may not include user input devices 88 and/or user output devices 90. In some examples, such as where controller 14 is a mobile or portable device such as a laptop computer, controller 14 may include additional components such as a battery that provides power to components of controller 14 during operation.

Processor(s) 80, in one example, is configured to implement functionality and/or process instructions for execution within controller 14. For instance, processor(s) 80 can be capable of processing instructions stored in storage device(s) 84. Examples of processor(s) 80 can include any one or more of a microprocessor, a controller, a micro-controller, a digital signal processor(s) (DSP), an application specific integrated circuit (ASIC), a field-programmable gate array (FPGA), a Programmable Logic Device (PLD), or other discrete or integrated logic circuitry.

Storage device(s) 84 can be configured to store information within controller 14 during operation. Storage device(s) 84, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 84 is a temporary memory, meaning that a primary purpose of storage device(s) 84 is not long-term storage. Storage device(s) 84, in some examples, is described as volatile memory, meaning that storage device(s) 84 do not maintain stored contents when power to controller 14 is turned off. Examples of volatile memories can include random access memories (RAM), dynamic random access memories (DRAM), static random access memories (SRAM), and other forms of volatile memories. In some examples, storage device(s) 84 is used to store program instructions for execution by processor(s) 80. Storage device(s) 84, in one example, is used by software or applications running on controller 14 (e.g., a software program implementing long-range cloud conditions detection) to temporarily store information during program execution.

Storage device(s) 84, in some examples, can also include one or more computer-readable storage media. Storage device(s) 84 can be configured to store larger amounts of information than volatile memory. Storage device(s) 84 can further be configured for long-term storage of information. In some examples, storage device(s) 84 include non-volatile storage elements. Examples of such non-volatile storage elements can include magnetic hard discs, optical discs, flash memories (e.g., MRAM, FRAM, eMMC, etc.), or forms of electrically programmable memories (EPROM) or electrically erasable and programmable (EEPROM) memories.

Aircraft interface 86 can be used to communicate information between controller 14 and an aircraft. In some embodiments, such information can include aircraft conditions, flying conditions, and/or atmospheric conditions. In some embodiments, such information can include data processed by controller 14, such as, for example, alert signals. Aircraft interface 86 can also include a communications module. Aircraft interface 86, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User input devices 88, in some examples, are configured to receive input from a user. Examples of user input devices 88 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 90 can be configured to provide output to a user. Examples of user output devices 90 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

User input and/or output devices 88 and 90, in some examples, includes a communications module. User input and/or output devices 88 and 90, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB).

The following are non-exclusive descriptions of possible embodiments of the present invention.

Apparatus and associated methods relate to a system for determining a wavelength of a narrow-band light beam. The system includes an optical filter having complementary transmission and reflection coefficients within a predetermined band of wavelengths inclusive of the wavelength of the narrow-band light beam. Each of the transmission and reflection coefficients monotonically varies throughout the predetermined band of wavelengths. The system includes a first photodetector configured to detect amplitude of a first portion of the narrow-band light beam transmitted through the optical filter. The first photodetector is further configured to generate a first output signal indicative of the detected amplitude of the first portion of the narrow-band light beam transmitted through the optical filter. The system includes a second photodetector configured to detect amplitude of a second portion of the narrow-band light beam reflected by the optical filter. The second photodetector is further configured to generate a second output signal indicative of the detected amplitude of the narrow-band light beam reflected by the optical filter. The system also includes a calculation engine configured to determine, based on a ratio of the first and second output signals, the wavelength of the narrow-band light beam.

The system of the preceding paragraph can optionally include, additionally and/or alternatively, any one or more of the following features, configurations and/or additional components:

A further embodiment of the foregoing system can further include an optical sensor and/or transducer configured to produce the narrow-band light beam having wavelength indicative of a value of a sensed physical parameter.

A further embodiment of any of the foregoing systems, wherein the calculation engine can be configured to determine the value of the sensed physical parameter based on the determined wavelength of the narrow-band light beam and a sensor specification.

A further embodiment of any of the foregoing systems can further include an optical fiber optically coupling the optical sensor to the optical filter.

A further embodiment of any of the foregoing systems, wherein the optical sensor can be a Fabry Pérot grating within the optical fiber.

A further embodiment of any of the foregoing systems can further include a second optical filter configured in a path of the narrow-band light beam. The second optical filter can be configured to transmit light within the predetermined band of wavelengths and to block transmission of light outside the predetermined band of wavelengths.

A further embodiment of any of the foregoing systems, wherein the calculation engine can be further configured to determine, based on a sum of the first and second output signals, amplitude of the narrow-band light beam.

A further embodiment of any of the foregoing systems, wherein the calculation engine can be configured to determine, based on a comparison between the first and second output signals, whether the wavelength of the narrow-band light beam is greater than or less than a predetermined threshold.

A further embodiment of any of the foregoing systems, wherein the predetermined threshold can be equal to a wavelength at which the transmission and reflection coefficients of the optical filter are equal to one another.

A further embodiment of any of the foregoing systems can further include an optical transmitter configured to transmit light having less than ten percent of its energy from light of wavelengths outside of the predetermined band of wavelengths.

A further embodiment of any of the foregoing systems, wherein the first and second photodiodes can be fast photodiodes capable of responding to changes in detected amplitudes of light of at least 100 ksps sampling rate. The calculation engine can be configured to determine the wavelength of the light detected by the first and second photodetectors at a sampling rate of at least 100 ksps.

A further embodiment of any of the foregoing systems, wherein the first and second photodiodes can be fast photodiodes capable of responding to changes in detected amplitudes of light of at least 1 Msps sampling rate. The calculation engine can be configured to determine the wavelength of the light detected by the first and second photodetectors at a sampling rate of at least 1 Msps.

In some embodiments, apparatus and associated methods relate to a method for determining a wavelength of a narrow-band light beam. The method includes optically filtering, using an optical filter having complementary transmission and reflection coefficients within a predetermined band of wavelengths inclusive the wavelength of the narrow-band light beam, the narrow-band light beam. Each of the transmission and reflection coefficients monotonically varies throughout the predetermined band of wavelengths. The method includes detecting, using a first photodetector, amplitude a first portion of the narrow-band light beam reflected by the optical filter. The method includes generating a first output signal indicative of the detected amplitude of the first portion of the narrow-band light beam transmitted through the optical filter. The method includes detecting, using a second photodetector, amplitude of a second portion of the narrow-band light beam transmitted through the optical filter. The method includes generating a second output signal indicative of the detected amplitude of the second portion of the narrow-band light beam reflected by the optical filter. The method also includes determining, using a calculation engine, the wavelength of the narrow-band light beam, based on a ratio of the first and second output signals.

The method of the preceding paragraph can optionally include, additionally and/or alternatively, any one or more of the following steps, features, configurations and/or additional components:

A further embodiment of the foregoing method can further include filtering, using a bandpass filter configure to pass light within the predetermined band of wavelengths and to block transmission of light outside the predetermined band of wavelengths, the narrow-band light beam.

A further embodiment of any of the foregoing methods can further include determining, using the calculation engine, amplitude of the narrow-band light beam, based on a sum of the first and second output signals.

A further embodiment of any of the foregoing methods can further include determining, using the calculation engine, if the wavelength of the narrow-band beam of light is greater than or less than a predetermined threshold, based on a comparison between the first and second output signals.

A further embodiment of any of the foregoing methods, wherein the predetermined threshold is equal to a wavelength at which the transmission and reflection coefficients of the optical filter are equal to one another.

A further embodiment of any of the foregoing methods can further include transmitting, using an optical transmitter, light having less than ten percent of its energy from light of wavelengths outside of the predetermined band of wavelengths.

A further embodiment of any of the foregoing methods can further include producing, using an optical sensor and/or transducer, an optical signal having an optical spectrum that is indicative of a measurement parameter.

A further embodiment of any of the foregoing methods can further include determining, using the calculation engine, a physical parameter based on the determined wavelength of the narrow-band light beam and a sensor specification.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining a wavelength of a narrow-band light beam, the system consisting of:
   an optical filter having complementary transmission and reflection coefficients within a predetermined band of wavelengths inclusive of the wavelength of the narrow-band light beam, each of the transmission and reflection coefficients monotonically varying throughout the predetermined band of wavelengths;
   a first photodetector configured to detect amplitude of a first portion of the narrow-band light beam transmitted through the optical filter, and to generate a first output signal indicative of the detected amplitude of the first portion of the narrow-band light beam transmitted through the optical filter;
   a second photodetector configured to detect amplitude of a second portion of the narrow-band light beam reflected by the optical filter, and to generate a second output signal indicative of the detected amplitude of the narrow-band light beam reflected by the optical filter; and
   a processor configured to determine, based on a ratio of the first and second output signals, the wavelength of the narrow-band light beam.

* * * * *